United States Patent
Johansson et al.

(10) Patent No.: US 7,269,189 B2
(45) Date of Patent: Sep. 11, 2007

(54) COHERENT LIGHT SOURCE BASED ON SUM-FREQUENCY MIXING

(75) Inventors: Sandra Johansson, Stockholm (SE);
Stefan Spiekermann, Hannover (DE);
Shunhua Wang, Stockholm (SE);
Valdas Pasiskevicius, Lidingo (SE);
Fredrik Laurell, Stockholm (SE);
Håkan Karlsson, Stockholm (SE);
Katrin Ekvall, Stockholm (SE)

(73) Assignee: Cobolt AB, Stockholm (SE)

( * ) Notice: Subject to any disclaimer, the term of this patent is extended or adjusted under 35 U.S.C. 154(b) by 302 days.

(21) Appl. No.: 11/038,432

(22) Filed: Jan. 21, 2005

(65) Prior Publication Data
US 2006/0165136 A1    Jul. 27, 2006

(51) Int. Cl.
*H01S 3/10* (2006.01)
(52) U.S. Cl. ......................................... 372/22; 372/21
(58) Field of Classification Search .................. 372/21, 372/22
See application file for complete search history.

(56) References Cited

U.S. PATENT DOCUMENTS

| 4,791,631 | A |   | 12/1988 | Baumert et al. |        |
|-----------|---|---|---------|----------------|--------|
| 4,879,723 | A |   | 11/1989 | Dixon et al.   |        |
| 5,142,542 | A |   | 8/1992  | Dixon          |        |
| 5,333,142 | A |   | 7/1994  | Scheps         |        |
| 5,341,393 | A |   | 8/1994  | Okazaki et al. |        |
| 5,412,674 | A |   | 5/1995  | Scheps         |        |
| 5,787,102 | A | * | 7/1998  | Alexander et al. | 372/22 |
| H001965   | H | * | 6/2001  | Burns et al.   | 372/22 |
| 6,373,868 | B1|   | 4/2002  | Zhang          |        |
| 2004/0125834 | A1 |   | 7/2004 | Spierkermann et al. | |

FOREIGN PATENT DOCUMENTS

EP    1 336 895    8/2003

OTHER PUBLICATIONS

Sandra Johansson et al., "Generation of Turquoise light by sum frequency mixing of a diode-pumped solid-state laser and a laser diode in periodically poled KTP", Optics Express, vol. 12, No. 20 (Oct. 4, 2004).

* cited by examiner

*Primary Examiner*—Armando Rodriguez
(74) *Attorney, Agent, or Firm*—Buchanan Ingersoll & Rooney PC

(57) ABSTRACT

A method and a device for generating visible coherent radiation is disclosed. The visible coherent radiation is generated by sum-frequency mixing of a first fundamental beam from a diode laser and a second fundamental beam from a diode-pumped solid-state laser. The mixing is performed by means of a quasi-phasematching element provided within the resonant cavity of the solid-state laser. The first fundamental beam is stabilized by providing feedback to the diode laser.

12 Claims, 2 Drawing Sheets

COHERENT LIGHT SOURCE BASED ON SUM-FREQUENCY MIXING

TECHNICAL FIELD

The present invention relates to a laser source incorporating sum-frequency mixing of two fundamental wavelengths.

BACKGROUND OF THE INVENTION

Low power, continuous-wave (CW) $Ar^+$-ion lasers are widely used in applications like bioanalysis, graphics and semiconductor inspection. In many biotech applications, the 488 nm line from the $Ar^+$-ion laser is employed. For this wavelength, particular chemistry has been developed and matched to fluorophores with relatively narrow absorption bands. During use, it is typically necessary to modulate the output from the laser in order, for example, to probe individual samples in an array. Such modulation has been effected primarily by means of acousto-optic modulators. It would thus be desirable to replace these bulky and rather inefficient $Ar^+$-ion lasers with diode-pumped alternatives, particularly for generating said radiation at 488 nm or close thereto.

In general, many applications require coherent light sources of comparatively high power. In particular, this may be the case for high-throughput systems where, for example, a large number of samples should be processed in parallel and/or at a high rate. Furthermore, there is typically a need for light sources having excellent beam quality, in order to provide high reliability for the devices using such light sources. There is also a desire to have small and compact devices, to facilitate mobility and to give a small footprint, and also to reduce power consumption. Additionally, and as mentioned above, there is often a requirement that these light sources can be modulated at any desired rate.

Thus, there is a general need in the prior art for more efficient and stable light sources with an aim of meeting the above requirements and desires, particularly for the visible region of the spectrum.

Visible laser radiation can be obtained in various ways. One approach could be direct frequency conversion of diode lasers (e.g. by second harmonic generation or by sum-frequency mixing). Diode lasers can be manufactured for a wide range of output wavelengths. When using the output from diode lasers for direct frequency conversion, it is often preferred to use periodically-poled non-linear crystals for the frequency conversion in order to obtain high conversion efficiency. However, in order to use diode lasers for frequency conversion in periodically poled non-linear crystals, these diode laser must be single mode. Periodically poled non-linear crystals are, amongst other things, characterized in that they exhibit a very narrow acceptance bandwidth, typically in the order of about 0.2 nm. This leads to high requirements on frequency stability for the lasers generating the fundamental beams for the non-linear interaction. In addition, high beam quality (typically $TEM_{00}$) is required to achieve high conversion efficiency in the non-linear process. A consequence is therefore that the available output power from the frequency conversion of diode lasers is inherently limited, because high power diode lasers tend to be multi mode both spectrally and laterally, and therefore highly unsuitable for frequency conversion in periodically poled non-linear optical crystals. Also, diode lasers present another drawback in that they have inherently large frequency bandwidths. If diode lasers are to be used for producing the fundamental radiation for non-linear frequency conversion processes, there is a need for some kind of frequency stabilization in order for the conversion process to remain efficient, and even if frequency stabilization is effected the output power is limited due to the single mode requirement described above.

Another approach could be to use second harmonic generation or sum-frequency mixing of diode-pumped solid-state lasers (DPSSLs) in a non-linear medium. The non-linear medium may be, for example, a periodically poled non-linear crystal, such as PP-KTP (periodically poled potassium-titanyl-phosphate, $KTiOPO_4$). DPSSLs are in general excellent in terms of beam quality, frequency stability, line width and power scaling. However, a major drawback of DPSSLs is that they are only available for a limited number of output wavelengths. Also, modulation of DPSSLs is a difficult task, for which typically external devices such as acousto-optic modulators are required.

One example of a DPSSL that may replace the $Ar^+$-ion laser for the 488 nm line is described in the published US patent application US 2004/0125834, which discloses a light source based on sum-frequency mixing of fundamental radiation from a four-level laser with fundamental radiation from a quasi-three-level laser to obtain visible radiation. In one example, radiation at 488 nm is obtained by mixing the output from a Nd:YLF laser operating at 1047 nm with the output from a $Nd:YVO_4$ laser operating at 914 nm. However, this solution only solves the problem of obtaining some specific wavelength, e.g. said line at 488 nm. Moreover, modulation of the output from such a laser can be cumbersome and may require costly auxiliary devices and/or lead to an overall reduction of output power.

A still further approach that has been proposed is to combine a diode laser and a DPSSL, and to generate visible coherent radiation by sum-frequency mixing of radiation from these two light sources.

U.S. Pat. No. 4,879,723 discloses a method of generating coherent optical radiation by sum-frequency mixing, wherein radiation of a first frequency is generated within an optical cavity by optically pumping a lasant material, radiation of a second frequency is generated from a diode laser, radiation of said second frequency is introduced into said optical cavity, and sum-frequency mixing is performed with a non-linear optical material within the optical cavity to produce optical radiation a third frequency which is the sum of said first and second frequencies.

U.S. Pat. No. 4,791,631 discloses a process for producing coherent radiation at essentially 459 nm by mixing, in a non-linear crystal of KTP, two fundamental laser beams, one at 808 nm and the other at 1064 nm. The idea is to be able to employ non-critical phase-matching in the KTP crystal.

U.S. Pat. No. 5,142,542 discloses sum-frequency mixing of two fundamental wavelengths, wherein the non-linear process takes place within a cavity that is resonant for both the fundamental wavelengths.

U.S. Pat. No. 5,412,674 also discloses sum-frequency mixing of two fundamental wavelength, particularly by means of a non-critical phase-matched KTP crystal.

SUMMARY OF THE INVENTION

However, all of the prior art referenced above suffer from some important limitations. While allowing different wavelengths to be obtained by sum-frequency mixing in various configurations, suitable phase-matching conditions must be provided for the non-linear process. In many of the cases, attempts are made to provide for non-critical phase-matching in the non-linear crystal. However, birefringent phase-matching can only be obtained for certain selections of fundamental wavelengths, since the phase-matching relies upon proper selection of propagation direction and polarization direction for the fundamental beams through the non-linear crystal in order for the necessary birefringent phase-matching to be obtained. Thus, arbitrary wavelengths can not be obtained by the technology referenced above, due to this limitation related to proper phase-matching.

Therefore, it is an object of the present invention to provide a simple scheme to obtain visible light by sum-frequency mixing (SFM) of radiation from a diode-pumped solid-state laser (DPSSL) and a diode laser (DL), wherein virtually any selection of fundamental wavelengths is possible.

This object is met by using, for the non-linear optical process, a periodically poled crystal having a quasi-phase-matching grating (QPM grating). An advantage obtained by a QPM grating is that it may be optimized for any non-linear optical interaction within the transparency range of the material, thus giving great freedom in designing the light source. In order to provide excellent stability for the diode laser, optical feedback to the diode laser is provided in order to lock the output thereof to the desired wavelength.

A DPSSL in the context of the present invention is typically constituted by a resonant cavity in which there is arranged a gain element. The gain element comprises a host material doped with an optically pumpable, active dopant. Examples of host materials are crystals of YAG, YLF, $YVO_4$, YAlO, YAP, or any suitable crystal, as well as glass. Examples of active dopants are rare earths, such as neodymium (Nd), and transition metals. Outside the resonant cavity, there is provided a pump diode laser for providing the optical pumping to the gain element. Typically, beam shaping optics will be provided for transforming the output from the pump diode laser into a shape suitable for the optical pumping.

The light source according to the invention may be conveniently modulated in output by modulating the diode laser, which produces one of the fundamental beams for the non-linear interaction.

Examples of DPSSL suitable for the present invention are those having a gain material of Nd:YAG, Nd:$YVO_4$, Nd:YLF, Nd:Gd$VO_4$, Nd:Glass. However, various other gain materials are also suitable.

Examples of non-linear materials suitable for the present invention are periodically poled crystals from the KTP family, e.g. KTP, RTP, RTA, KTA, CTA, etc., as well as other non-linear crystals suitable for periodic poling such as lithium niobate (LN) and lithium tantalate (LT). However, various other non-linear crystals are also suitable.

Preferably, the sum-frequency mixing is performed in a periodically poled crystal of KTP (PP-KTP).

By using sum-frequency mixing of radiation from a DL and radiation from a DPSSL, any wavelength can in principle be generated by appropriate choice of light sources and QPM grating parameters.

In order to achieve high conversion efficiency for the sum-frequency mixing of the fundamental wavelengths, the non-linear material with the QPM grating is located within the resonant cavity of the DPSSL, into which the emission from the DL is introduced. The fundamental beam from the DL and from the DPSSL are made co-linear and are made to propagate through the QPM grating within said resonant cavity of the DPSSL, such that efficient generation of light having a frequency which is the sum of the two fundamental frequencies is obtained.

In order to overcome any problems relating to poor stability and broadband wavelength emission for the DL, it is proposed to use stabilization of the DL by optical feedback. In a preferred embodiment, such feedback is provided by means of a transmission grating placed in front of the DL, mounted in a Littrow configuration, to select a particular longitudinal mode or a narrow spectrum of the DL. The use of a transmission grating mounted in a Littrow configuration for providing stabilizing feedback to the DL is particularly advantageous, because it involves a minimum number of components, it is very compact in size, and the alignment of the relevant optical components is simple and straightforward. The stabilized output from the DL is subsequently introduced into the cavity of the DPSSL, in which there is provided the non-linear element with the QPM grating adapted for sum-frequency mixing. As will be described in more detail later, the transmission grating in Littrow configuration can also be utilized for tuning the output from the DL.

The output from the light source according to the invention is suitably and conveniently modulated as desired by modulating the output from the DL that provides the first fundamental beam. Since the output generated by sum-frequency mixing is directly dependent upon the two fundamental beams, this output can be modulated through the modulation of either of these fundamental beams.

An advantageous characteristic of the light source according to the present invention is that the beam quality of the light generated by sum-frequency mixing is determined by the overlap between the interacting fundamental beams within the non-linear crystal. Hence, by employing a high quality fundamental beam from a DPSSL which interacts with another fundamental beam from a DL (which may have a comparatively poor quality), the generated light will have beam properties similar to the high quality beam from the DPSSL. As a consequence, broad-stripe high power diode laser can be used without degrading the beam quality of the output. Thus, the output power may be scaled to high powers without substantially altering the design.

Moreover, the conversion efficiency of the non-linear process (the sum-frequency mixing) is proportional to the intensity of both of the interacting beams. Thus, by performing the sum-frequency mixing within the resonant cavity of the DPSSL, where the intensity is high, maximum output power is obtained.

BRIEF DESCRIPTION OF THE DRAWINGS

In the following detailed description, reference will be made to the drawings, on which.

DETAILED DESCRIPTION OF PREFERRED EMBODIMENTS

Some practical implementations of the present invention will now be described with reference to the drawings.

Figure 1:
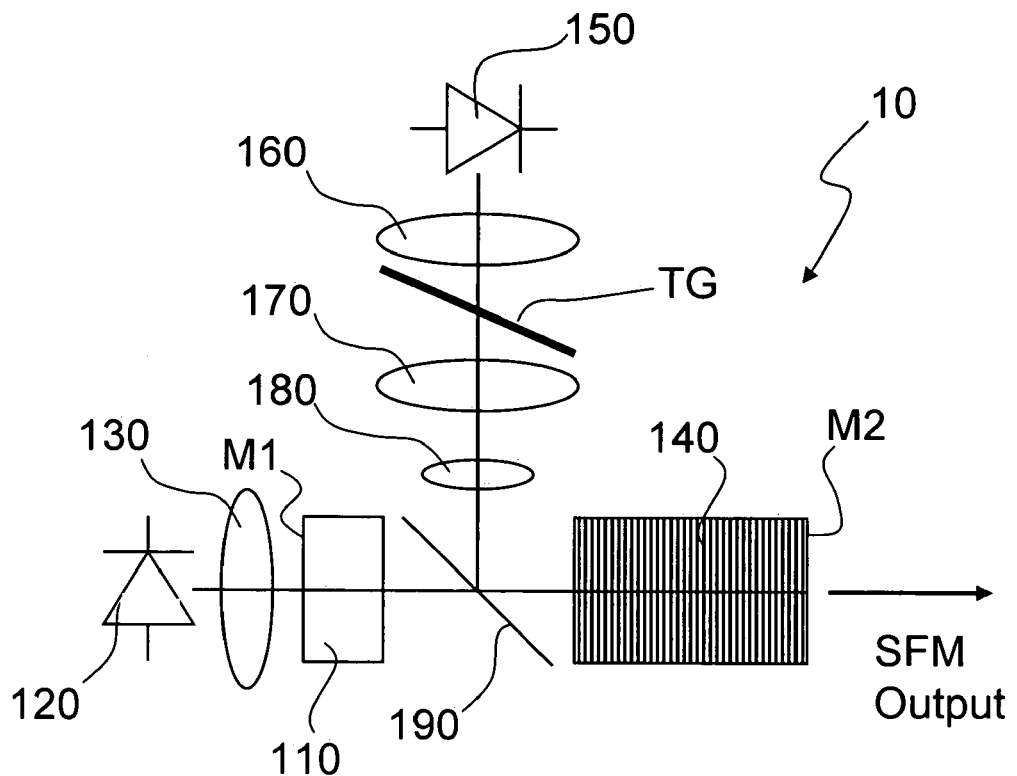
FIG. 1 schematically shows one embodiment of the present invention.

FIG. 1 shows schematically a first embodiment of a light source 10 according to the invention. The light source comprises an optically pumpable solid-state gain material 110 and a first diode laser (DL) 120 arranged to provide radiation for optical pumping to the gain material 110. In the optical path between the first DL 120 and the gain material 110, there is provided beam shaping optics 130 for transforming the beam output from the DL into a shape appropriate for pumping of the gain material 110. The gain material 110 is provided with a first cavity mirror M1 on the side facing the pumping DL 120. The light source further comprises an optically non-linear material 140 in the form of a periodically poled crystal. On the side facing away from the pumping DL 120, the periodically poled crystal is provided with a mirror constituting a second cavity mirror M2. Effectively, the cavity mirrors M1 and M2 form a resonant cavity, in which both the gain material 110 and the periodically poled crystal are located. Since the gain material 110 is optically pumped by means of the first DL 120, this constitutes a diode-pumped solid-state laser (DPSSL).

The light source as schematically shown in FIG. 1 further comprises a second DL 150. The light emitted by the second DL 150 is collected and shaped by a lens or lens package 160 into a substantially parallel and expanded beam. In the beam path of the expanded and substantially parallel beam from the second DL 150, there is located a transmission grating TG, which transmits a majority of the light emitted by the second DL 150, but reflects some light due to its grating properties. The transmission grating is provided in a Littrow configuration, which will be described in more detail below. After the transmission grating, the substantially parallel and expanded beam is further shaped and concentrated by another set of lenses or lens packages 170, 180 and incident upon a dichroic mirror 190. The dichroic mirror 190 is designed and located such that the light emitted by the second DL 150, which has been shaped and formed by the mirrors 160, 170, 180, is directed towards the periodically poled crystal 140 in a beam path co-linear with the light oscillating in the resonant cavity between mirrors M1 and M2. In effect, the light generated by the DPSSL by means of the gain material 110 and the resonator mirrors M1 and M2, and the light emitted by the second DL 150 passes the periodically poled crystal 140 as two overlapping beams.

Hence, the diode laser 150 generates a first fundamental beam of coherent radiation at a first frequency. The DPSSL generates a second fundamental beam of coherent radiation at a second frequency. In order to generate light having a higher frequency than both of said fundamental frequencies, the periodically poled crystal 140 is designed and structured to enhance sum-frequency mixing in order to generate coherent radiation having a frequency which is the sum of said first and second frequencies (indicated in the figures as the SFM output).

In the embodiment shown in FIG. 1, both the first cavity mirror M1 and the second cavity mirror M2 are dielectric mirrors deposited directly upon the end face of the gain material 110 and the periodically poled crystal 140, respectively. It is to be understood, however, that other embodiments may have other types of cavity mirrors.

In this embodiment, the first cavity mirror M1 is designed for high transmission of the radiation emitted by the pumping DL 120 in order for this radiation to reach the gain material 110 and effect the optical pumping thereof. Mirror M1 is further designed for high reflection of one characteristic frequency of the gain material in order to effect optical feedback into the resonant cavity formed by the mirrors M1 and M2. The second cavity mirror M2, which is deposited on the end face of the periodically poled crystal 140, is also designed for high reflection of said characteristic frequency of the gain material. Together, mirrors M1 and M2 form the resonant cavity for the characteristic frequency. Mirror M2 is also designed for high transmission of the sum frequency, in order to let the generated sum-frequency radiation out from the resonant cavity in the form of an output beam.

The dichroic mirror 190 is degined for high transmission of the frequency resonating between mirrors M1 and M2 in order to keep optical losses within the cavity at a minimum. The dichroic mirror 190 is further designed for high reflection of the frequency emitted by the second DL 150.

Figure 2:
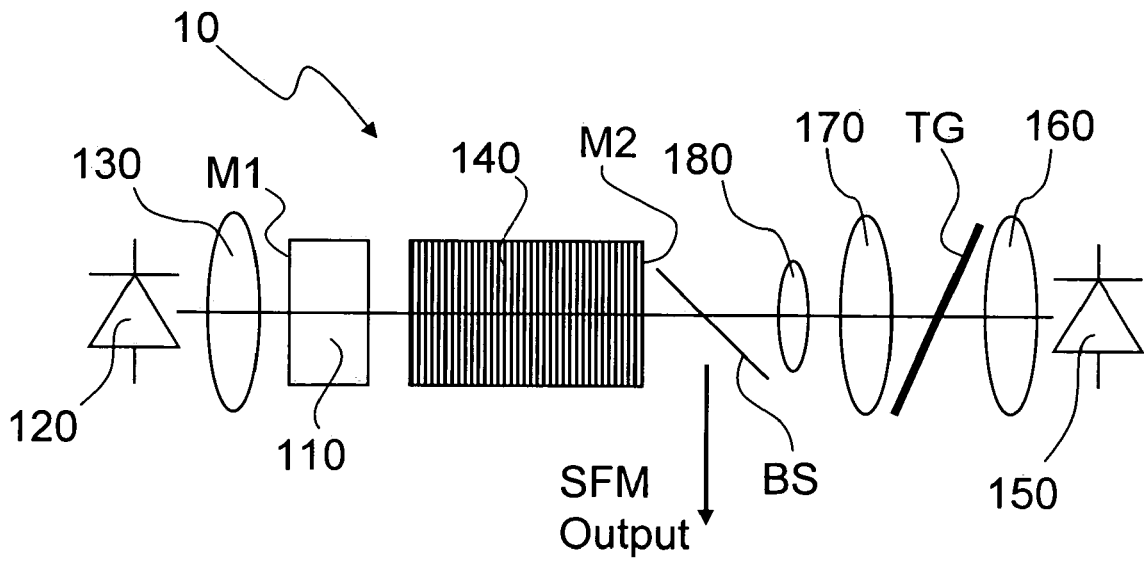
FIG. 2 schematically shows another embodiment of the present invention.

Another embodiment of the present invention is schematically shown in FIG. 2. This embodiment resembles to some extent that shown in FIG. 1. However, in this case, there is no dichroic mirror within the resonant cavity. Rather, light from the second DL 150 is introduced into the resonant cavity (formed by mirrors M1 and M2) longitudinally through the output mirror M2. An arrangement like the one shown in FIG. 2 further reduces the optical losses within the cavity. Light from the second DL 150 is launched into the cavity through a beam splitter BS, which is designed for high transmission of the light emitted by DL 150. The same beam splitter BS is designed for high reflection of the sum-frequency light generated by the crystal 140 inside the cavity, in order to provide an output beam from the light source 10. It should be noted that, for the case shown in FIG. 2, the fundamental beam from the DL 150 would propagate leftward in the figure. Although not specifically shown in the figure, the light generated by the sum-frequency mixing process would therefore be reflected back towards the beam splitter BS either by the cavity mirror M1 or by some other surface having high reflectivity for the generated wavelength.

Figure 3:
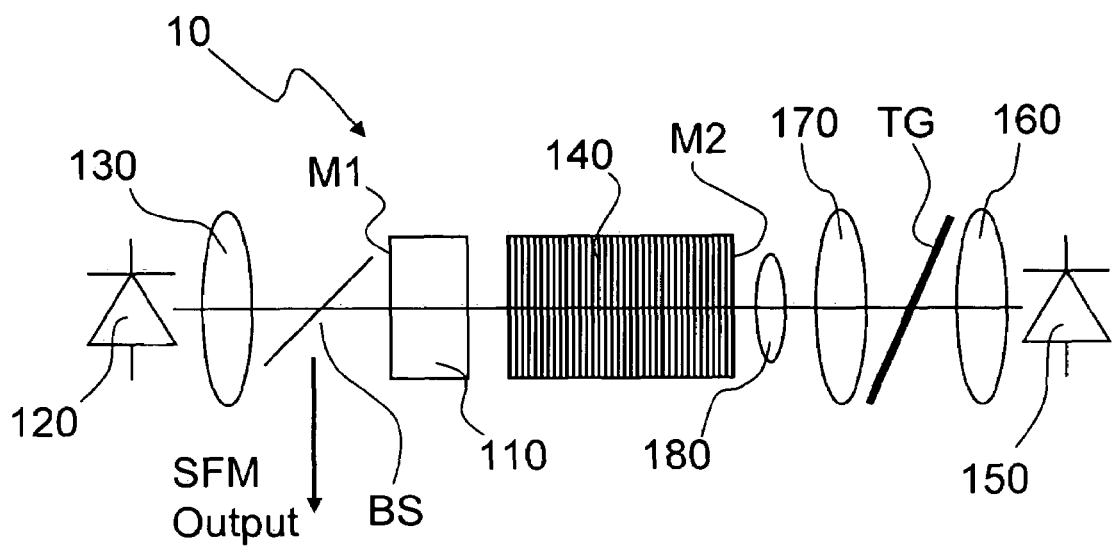
FIG. 3 schematically shows yet another embodiment of the present invention.

The beam splitter could also be arranged between the first cavity mirror M1 and the pump diode laser 120, as shown in FIG. 3. An advantage of such arrangement would be that the generated beam does not need to be retroreflected back through the non-linear crystal. Instead, however, the pump beam from the diode laser 120 will need to be launched through this beam splitter in order to reach and provide optical pumping for the gain material 110.

Instead of having the second cavity mirror M2 deposited directly upon the non-linear crystal 140, it is also conceivable to use a separate mirror. Having a separate mirror may be advantageous in many cases, due to ease of alignment of the optical components and the possibility of making the second cavity mirror curved such that resonator stability is improved. In such case, the end face of the non-linear crystal may be anti reflection coated in order to reduce losses within the cavity. Having read and understood the present specification, the ordinary artisan will find various ways of implementing the cavity mirrors.

In another modification of the light source, the beam splitter BS may be located between the gain element 110 and the non-linear crystal 140.

Figure 4:
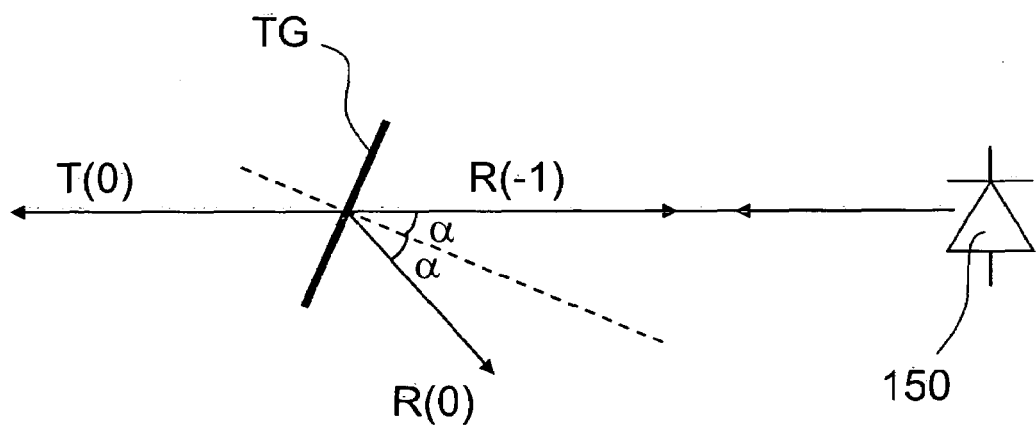
FIG. 4 illustrates the principle behind stabilization of a diode laser by means of a transmission grating in Littrow configuration.

The principle behind the Littrow configuration for the transmission grating TG will now be described in more detail with reference to FIG. 4. In FIG. 4, the beam shaping optics 160, 170, 180 between the DL 150 and the grating TG, as well as after the grating, has been omitted for clarity. As generally known, a grating of this kind will split an incident ray of light into a zeroth order reflected ray R(0) (specular reflection) and higher order reflected rays having reflection angles greater than the zeroth order reflected ray. Amongst the higher order reflected rays are first order rays on both sides of the specular zeroth order reflection. Typically these first order rays are called the −1 order reflected ray R(−1) and the +1 order reflected ray R(+1). Similar diffraction will occur in transmission, i.e. into a zeroth order transmitted ray T(0) (no deflection) and transmitted rays of higher orders. As known in the art, the diffraction angles for the higher order rays depends on the wavelength of the incident light in relation to the grating period. This means that, for each wavelength incident upon the grating there will be a different diffraction angle. A majority of the light diffracted from the grating will be found in the zeroth order rays in both transmission T(0) and reflection R(0). The amount of light found in transmission versus reflection will depend on the strength of the grating.

In accordance with the present invention, the transmission grating is employed for providing feedback to the DL 150 in order to stabilize the emission from the latter. Taking into account that the amount of light required in order to stabilize the DL 150 is small, the transmission grating TG can be designed to be a weak one, i.e. to only reflect a small ratio of the incident light. Hence, most light incident upon the grating from the DL 150 will pass through substantially undisturbed as the zeroth order transmitted ray T(0). However, some light will be diffracted by the grating, and a small ratio of such light will be found in reflection from the grating. (It should be noted that most of the incident light is transmitted through the grating, hence "transmission grating".)

In order to provide the desired feedback to the DL 150, the transmission grating TG is disposed and adapted substantially such that the −1 order reflected ray R(−1) for a particular wavelength occurs at an angle of reflection a equal to the angle of incidence a for the light from the DL 150. Of course, the wavelength diffracted in reflection along this angle depends upon the grating period. In effect, the comparatively broadband emission from the DL 150 is incident on the grating TG, and a particular wavelength component of this light is diffracted in reflection back towards the DL. The diffracted wavelength component that is directed back towards the DL has a much narrower wavelength range than the original emission from the DL. Thus, narrow-band feedback is provided for the DL, which in turn will lock its emission onto this wavelength subject to feedback.

Since different wavelength components are diffracted in slightly different angles from the grating, the output from the DL 150 can be tuned by turning the grating slightly, such that the angle of incidence for light from the DL is changed.

It is to be understood that, at any particular optical frequency for a beam of light, the corresponding wavelength depends upon the refractive index of the medium through which the beam propagates. In this context, the wavelength corresponding to a particular frequency when the beam propagates through empty space (refractive index equal to 1) will in the following be called the corresponding free-space wavelength (or just wavelength). It should be noted that the refractive index of air is very close to that of empty space. Hence, in all practical aspects, the free-space wavelength will be equal to the wavelength in atmospheric air.

A detailed example of a light source according to the invention will now be given. The set-up for the light source is as schematically shown in FIG. 1. The example relates to a light source for producing coherent radiation at a free-space wavelength of 492 nm by sum-frequency mixing of fundamental radiation at a free-space wavelength of approximately 1064 nm from a diode pumped Nd:YVO$_4$ laser and fundamental radiation at a free-space wavelength of 916 nm from a diode laser.

A first beam of fundamental radiation is obtained from a DL operating at 916 nm. The output wavelength of the DL is stabilized by means of a transmission grating in Littrow configuration as described above. The grating period for the transmission grating is 2000 lines/mm, and it is oriented at an angle of 66.3° with respect to the DL in order to provide feedback at the desired wavelength by means of the −1 order reflection.

A second beam of fundamental radiation is obtained from a DPSSL. The DPSSL according to this example comprises a gain material of Nd:YVO$_4$ having a Nd-content of 0.7 atm %. This gain material is optically pumped with a laser diode operating at a free-space wavelength of 808 nm to match the absorption band of the gain material.

Within the resonant cavity of the DPSSL there is provided a 9 mm long periodically poled crystal of KTiOPO$_4$ (PP-KTP). The PP-KTP has a grating period of 6.99 µm designed for first order quasi-phasematching, using the d$_{33}$ non-linear coefficient, of sum-frequency mixing of the two fundamental beams at 1064 nm and 916 nm, respectively. In order to fine tune the non-linear process, the PP-KTP is temperature tuned to reach maximum efficiency.

The first beam of fundamental radiation is introduced into the resonant cavity of the DPSSL by means of a dichroic mirror as shown in FIG. 1.

In a light source according to this example, turquoise radiation at a free-space wavelength of 492 nm is obtained in a stable and efficient manner.

In another example, coherent radiation at 488 nm is generated by sum-frequency mixing of a first fundamental beam of radiation at 914 nm, generated by a diode laser, and a second fundamental beam of radiation at 1047 nm, generated by a Nd:YLF laser.

Examples of suitable diode lasers having an emission wavelength around 910-920 nm are AlInGaAs diode lasers and InGaAs lasers. Suitable diode lasers are also available having emission wavelengths of 795 nm, 808 nm and 980 nm, to give some examples.

The narrow phase-matching bandwidth of periodically-poled crystals (typically a fraction of a nanometer, such as about 0.2 nm) can also be expressed as a temperature bandwidth for a fixed wavelength. Typically, the temperature bandwidth (FWHM) is a few degrees. In order to tune the inventive light source to optimal efficiency, the non-linear crystal is therefore preferably mounted on a temperature control stage, such as a thermo-electric element. At the same time, further possibilities of tuning the device can be obtained by tuning the first fundamental beam produced by the diode laser. Tuning of the first fundamental beam can be performed by adjusting the Littrow-mounted transmission grating, by altering the temperature of the diode laser, and/or by changing the electrical drive signal injected into the diode laser.

To further enhance the stability of the inventive light source, it is possible to provide means for making the DPSSL single mode.

Although the present invention has been described with respect to neodymium doped gain materials for the DPSSL, it is to be understood that other types of DPSSLs can be used within the scope of the invention. In particular, it is conceivable and contemplated that the DPSSL is a quasi-three level laser operating on atomic transitions that give shorter emission wavelengths than those mentioned above. For example, a Nd:YAG laser may be operated to emit coherent radiation at 946 nm, a Nd:YVO$_4$ laser may be operated to emit at 914 nm, a Nd:YAlO laser may be operated to emit 930 nm and a Nd:YLF laser may be operated to emit coherent radiation at 908 nm.

Having read and understood the specification above and the claims that follow, it will be clear to the ordinary artisan that various modifications and alternatives are available within the scope and spirit of the invention.

The invention claimed is:

1. A method of generating coherent optical radiation, comprising the steps of:
   generating a first fundamental beam of coherent radiation at a first frequency by means of a diode laser;
   generating a second fundamental beam of coherent radiation at a second frequency by means of a diode pumped solid-state laser within a resonant cavity thereof;
   stabilizing the first fundamental beam of coherent radiation generated by said diode laser by providing optical feedback to the diode laser by means of a transmission grating that provides the optical feedback to said diode laser;
   introducing said first fundamental beam into said resonant cavity; and
   generating coherent radiation at a third frequency, which is the sum of said first frequency and said second frequency, by means of a non-linear crystal provided with a quasi-phasematching grating and located within said resonant cavity.

2. The method of claim 1, wherein the coherent radiation at the third frequency is generated by means of a periodically-poled crystal of KTP located within the resonant cavity.

3. The method of claim 1, wherein a first order reflection from the transmission grating is used for providing feedback to the diode laser, said transmission grating being arranged in Littrow configuration.

4. The method of claim 1, further comprising the step of modulating the first fundamental beam, and thereby modulating the generation of coherent radiation at the third frequency.

5. The method of claim 1, wherein the diode laser used for generating the first fundamental beam is a broad-stripe high power diode laser.

6. The method of claim 1, wherein the first fundamental beam is introduced into the resonant cavity literally by means of a dichroic mirror disposed within said resonant cavity.

7. The method of claim 1, wherein the first fundamental beam is introduced into the resonant cavity longitudinally, and wherein a beam splitter is provided for extracting the third frequency laterally from the resonant cavity.

8. A light source, comprising:
   a diode laser (DL) for generating a first fundamental beam of coherent radiation at a first frequency;
   a diode-pumped solid-state (DPSSL) laser for generating a second beam of coherent radiation at a second frequency, said DPSSL having a resonant optical cavity;
   a non-linear crystal having a quasi-phasematching (QPM) grating and located within said resonant cavity;
   means for providing optical feedback to said DL for stabilization thereof; and
   means for introducing said first fundamental beam into said resonant cavity;
   wherein the QPM grating of said non-linear crystal is designed and structured for phasematching sum-frequency mixing (SFM) of said first fundamental beam and said second fundamental beam, to generate a third beam at a frequency being the sum of said first frequency and said second frequency.

9. The light source of claim 8, wherein the means for providing optical feedback comprises a transmission grating mounted in Littrow configuration.

10. The light source of claim 8, wherein the non-linear crystal having a quasi-phasematching (QPM) grating comprises a periodically-poled crystal of KTP.

11. The source of claim 8, wherein the DPSSL comprises a gain element in the form of a host crystal doped with neodymium.

12. The light source of claim 8, wherein the means for introducing said first fundamental beam into said resonant cavity comprise a dichroic mirror structured and arranged for making the first and the second fundamental beams co-linear within the QPM grating.

* * * * *